United States Patent [19]

Welker

[11] 4,046,300
[45] Sept. 6, 1977

[54] SCORED GLASS BRACKET BREAKING APPARATUS

[75] Inventor: Robert H. Welker, Perrysburg, Ohio

[73] Assignee: Libbey-Owens-Ford Company, Toledo, Ohio

[21] Appl. No.: 691,903

[22] Filed: June 1, 1976

[51] Int. Cl.² ............................................. C03B 33/04
[52] U.S. Cl. ..................................... 225/103; 225/96.5
[58] Field of Search ...................... 225/103, 96.5, 2, 93

[56] References Cited

U.S. PATENT DOCUMENTS

| 2,259,765 | 10/1941 | Morris | 225/93 |
| 3,770,173 | 11/1973 | Carothers et al. | 225/96.5 X |
| 3,786,973 | 1/1974 | Bussman et al. | 225/2 |

Primary Examiner—Frank T. Yost
Attorney, Agent, or Firm—Collins, Oberlin & Darr

[57] ABSTRACT

A glass pattern breaking apparatus having a press roll which is rollably movable across a prescored glass bracket supported upon an aligned template for breaking out the prescored pattern. The press roll is provided with an elongated rigid core shaft covered by a pliable resilient body, and its ends are journalled in freely vertically movable slide mechanisms so that its weight may freely bear against the glass bracket. The core shaft may be hollow so that it can be filled with water or granular material whereby its weight can be changed to break out patterns from glass brackets of different thicknesses.

8 Claims, 5 Drawing Figures

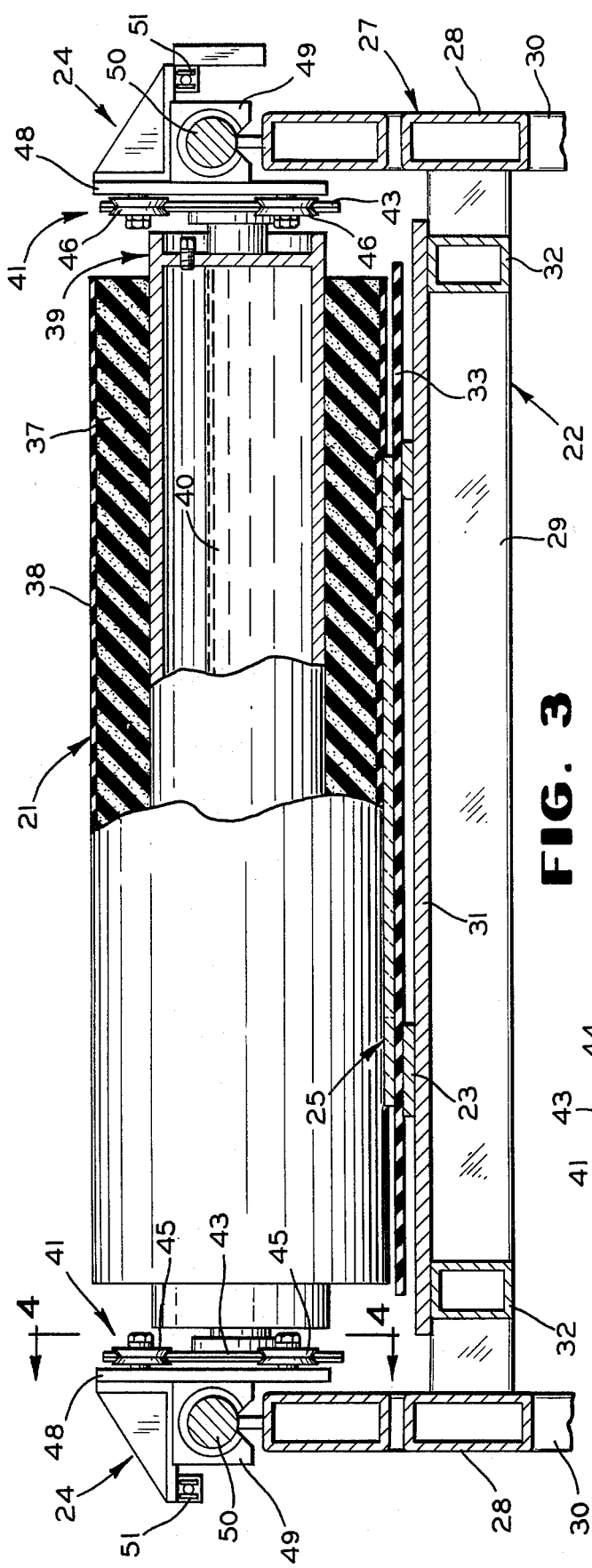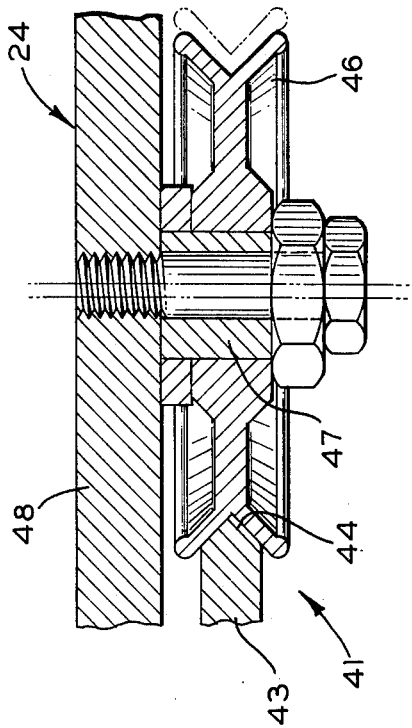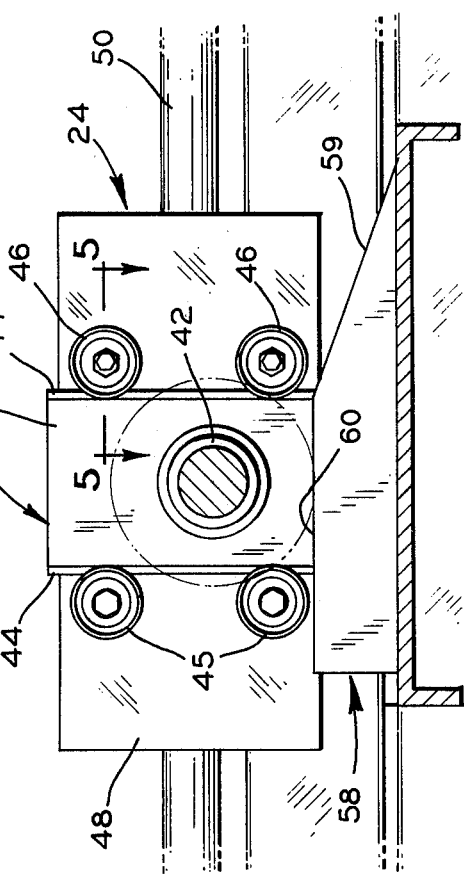

SCORED GLASS BRACKET BREAKING APPARATUS

BACKGROUND OF THE INVENTION

1. Field of the Invention

The present invention relates generally to the glass cutting art and more specifically to a press roll for breaking out a prescored glass pattern from a larger sheet or bracket of glass.

2. Description of the Prior Art

In manufacturing automotive vehicle windows which involve a variety of shapes, it is desirable to make a clean break of a prescored glass pattern so that the periphery of the cut-out or broken-out pattern has smooth perpendicular edges free of chips or nicks. One way of doing this is to rollably move a pressing roll over a prescored glass bracket supported on a rigid breakout template as disclosed in U.S. Pat. No. 3,770,173, issued on Nov. 6, 1973.

The pressing roll described in the aforementioned patent is a weighted pliable elongated roller having a relatively thin fluid-type resilient housing of rubbery material filled with a fluid. The resiliency of the housing and the fluid filling provides a sausage-like roller structure tending to sag at its central portion which passes over the central portion of the glass bracket. However, the sausage-like roller has not proved to be entirely satisfactory for its purpose in that it causes the prescored glass bracket to be loaded by statically unpredictable forces making it difficult, if not impossible, to regulate the forces acting on the glass bracket to cleanly break out the prescored pattern. Furthermore, the resilient housing of the pressing roll is subject to punctures by the broken jagged selvage edges of the glass bracket which, of course, results in loss of the fluid filling which necessitates replacement of the roll and, thus, loss of production time.

SUMMARY OF THE INVENTION

Briefly, the instant invention provides a press roll for use in a pattern glass breaking apparatus that overcomes the aforementioned disadvantages by loading the glass bracket with a statically predictable force to cleanly break out a prescored glass pattern. Thus, the press roll, according to the invention, comprises an elongated rigid core shaft covered by a resilient deformable body together with means for applying its weight along a straight line and against the prescored glass bracket so that the glass bracket is uniformly loaded with a constant predetermined force. To this end, the press roll is journalled in slide mechanisms wherein the slide mechanisms permit the press roll to freely bear against the glass bracket.

OBJECTS AND ADVANTAGES

Accordingly, an object of the invention is to provide a pattern glass breaking apparatus with a press roll which applies a uniform load along a straight line to a prescored glass bracket with a statically predictable force.

Another object of the invention is to provide a pattern glass breaking apparatus with a press roll which is freely floating so that its weight directly bears against a prescored glass bracket.

Yet another object of the invention is to provide a pattern glass breaking apparatus with a press roll having a rigid core shaft covered with a resilient deformable body.

Other objects and advantages will become more apparent during the course of the following description when taken in connection with the accompanying drawings.

BRIEF DESCRIPTION OF THE DRAWINGS

In the drawings, wherein like numerals are employed to designate like parts throughout the same:

FIG. 3 is an enlarged cross sectional view taken substantially along line 3—3 of FIG. 1, illustrating another embodiment of the press roll;

FIG. 4 is an enlarged side elevational view taken substantially along line 4—4 of FIG. 3, illustrating a slide mechanism for permitting free movement of the press roll; and FIG. 5 is an enlarged cross sectional view taken substantially alone line 5—5 of FIG. 4, further illustrating the slide mechanisms.

DESCRIPTION OF THE PREFERRED EMBODIMENTS

Figure 1:
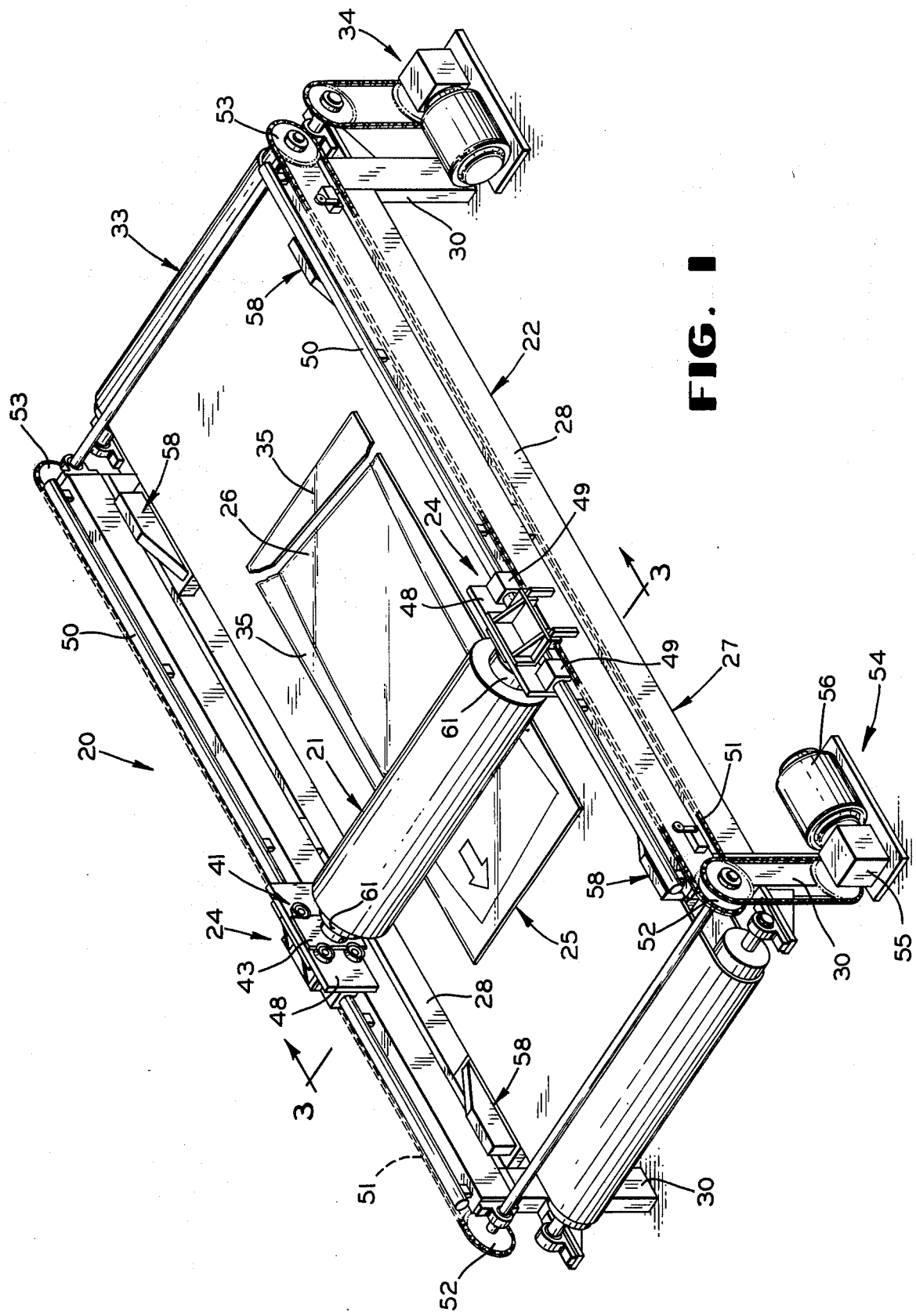
FIG. 1 is a perspective view of a glass pattern breaking apparatus employing a press roll constructed in accordance with the invention.

Referring now to the drawings and particularly to FIG. 1, there is illustrated a glass pattern breaking apparatus designated in its entirety by the reference numeral 20 which is provided with a press roll 21 constructed in accordance with the invention. In addition to the press roll, the breaking apparatus 20 generally comprises a support table 22 having a horizontal top surface adapted to support a rigid breakout template 23 (see FIG. 3). The press roll is mounted above the support table 22 and is connected to means 24 for rollably moving the roll 21 across a glass bracket 25 supported upon the breakout template 23 to cleanly and smoothly break out a prescored pattern 26 from the glass bracket 25.

As illustrated in FIGS. 1 and 3, the support table 22 generally comprises an open, horizontally disposed rectangularly shaped framework 27 having side rails 28 and end rails 29 (see FIG. 3) which is supported by upstanding corner posts 30. A floor plate 31 for supporting the breakout template 23 is horizontally disposed on a pair of spaced apart parallel support rails 32 which extend between the end rails 29. The breakout template 23 is supported by the floor plate 31 beneath the top flight of an endless belt conveyor 33 which facilitates handling of the prescored glass bracket 25. The belt of the conveyor is composed of a friction material having a surface which tends to hold the glass bracket in position over the breakout template 23 when the press roll 21 is advanced over the glass bracket 25. Also, the conveyor is adapted to be intermittently driven by a drive mechanism 34 to remove the selvage edges 35 of the glass bracket 25 after the prescored pattern 26 has been broken therefrom.

Figure 2:
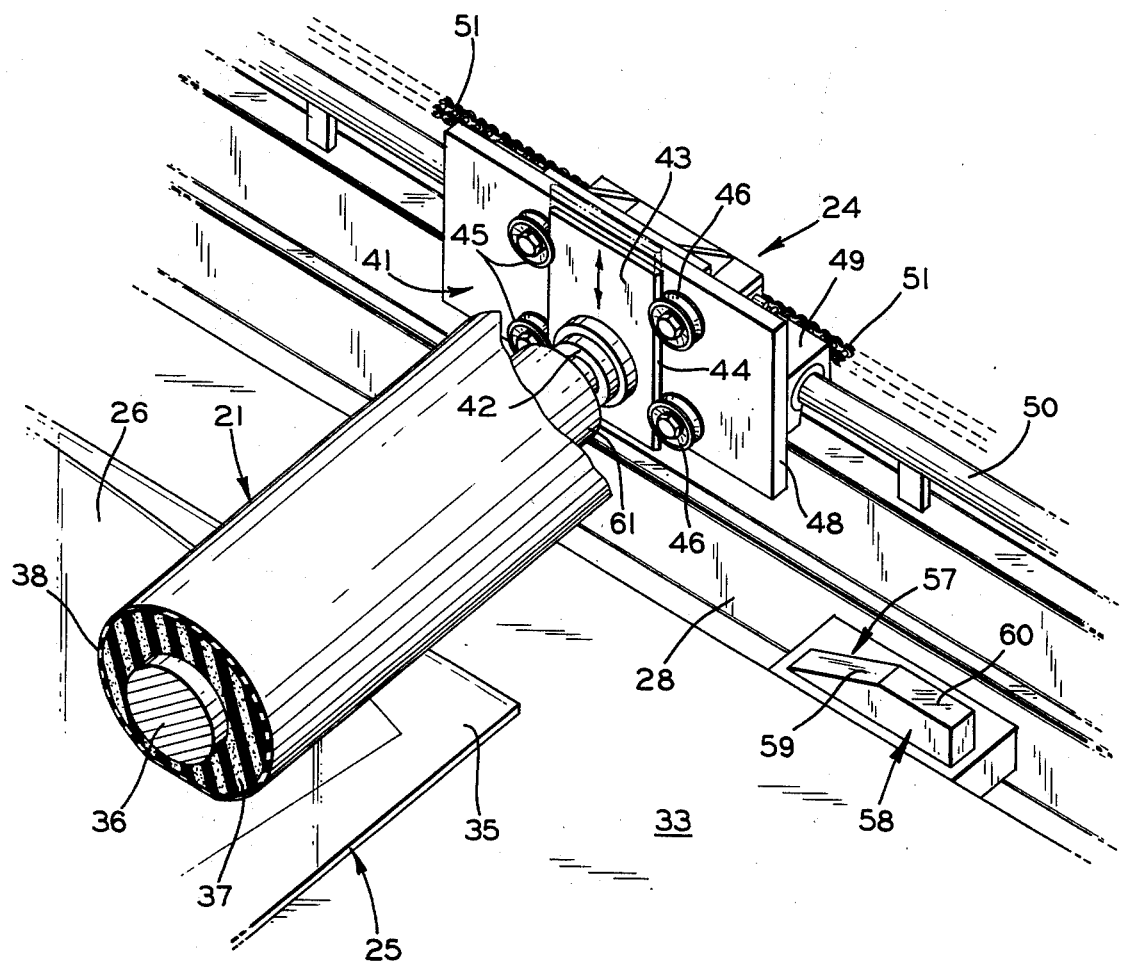
FIG. 2 is an enlarged, fragmentary perspective view of one embodiment of the press roll illustrated in FIG. 1.

According to the invention, the press roll 21 loads the glass bracket with a uniform predetermined static force. To this end, the weight of the press roll is freely applied against the glass bracket along a straight line path. Thus, as illustrated in FIG. 2, the press roll 21 comprises an elongated rigid core shaft 36 which is covered with a resilient body 37 of foam material for protecting the glass bracket as it is rolled thereover. The resilient body 37 is provided with a thin skin or shell 38 of a material that is resistant to abrasion and oil. Each end of the core shaft extends beyond the resilient body, the purpose of which will be described hereinafter. The dimensions and weight of the roll, of course, depend upon the size and thickness of the glass bracket 25 to be broken. It has been found that a roll having a solid core shaft 36 of about 6 inches in diameter which is covered by resilient body 37 of about two inches in thickness, will cleanly break out the prescored pattern 26 from a one-eighth inch thick glass bracket. However, when the glass bracket has a thickness greater than one-eighth inch, the press roll must have a greater weight. Thus, the press roll 21 illustrated in FIG. 3, is provided with an elongated rigid hollow core shaft 39 which may be filled with fluid or granular material 40 whereby its weight can be changed in accordance with the thickness of the glass bracket to be broken. In all other respects, the roll construction is the same as the construction of the previously described roll. Since the press roll 21 is provided with a rigid core shaft, it is rollably moved across the glass bracket without the disadvantage of sagging or dragging and thus will apply its weight against the bracket 25 along a straight line. The core shafts 36 and 39 also have the advantage of being reusable, as a new body 37 of resilient material can be molded thereon when the original body has become worn or damaged.

In order to apply the weight of the press roll 21 against the flat surface of the glass bracket 25, the press roll is floatingly supported in a plane substantially perpendicular to the glass bracket by slide mechanisms 41 mounted on the moving means 24 whereby its weight freely bears against the glass bracket 25. Thus, as best illustrated in FIG. 2, each end of the press roll 21 is journalled in a bearing 42 which is mounted in a vertically movable slide 43. The vertical edges 44 of the slide 43 are V-shaped (see FIG. 5) so that they may be movingly supported between cooperating pairs of spaced apart grooved rollers 45 and 46 wherein the rollers 46 are adjustably mounted by means of an eccentric bushing 47 on the moving means 24 so as to align the slides 43 vertically (see FIGS. 4 and 5).

Referring now to FIG. 1, each moving means 24 for rolling the press roll 21 along the top surface of the support table 22 includes a plate member 48 on which the grooved rollers 45 and 46 of the slide mechanisms 41 are mounted. Each plate member is also provided with a sliding type bearing block 49 which is adapted to move forwardly and backwardly along a guide rail 50 extending along and attached to the side rail 28 of the support table 22. Each moving means 24 is connected to an endless chain 51 entrained about sprocket wheels 52 and 53 which are rotatably disposed at each end of the support table 22. Each endless chain 51 is moved in either direction by a drive mechanism 54 which includes a gear reduction unit 55 and a reversible drive motor 56.

Referring now to FIG. 2, means 57 is provided at each end of the support table 22 to lift the press roll 21 from the support table 22 so that the conveyor 33 can remove the selvage glass 35 therefrom and clear the template area for the next glass bracket 25. Each lift means 57 comprises a cam 58 having an inclined ramp portion 59 and a horizontal portion 60 and is mounted on the support table 22. Each cylindrical end 61 of the rigid core shaft of the press roll 21, that extends beyond the ends of the resilient foam body 37, cooperates with a cam 58 to lift the roll 21 from conveyor 33 to permit selvaged glass to move therebeneath.

In operation, the prescored glass bracket 25 is accurately deposited on the stopped conveyor 33 over the aligned template 23 by means (not shown). The roll moving means 24 is actuated by the reversible drive mechanism 54 to rollably move the press roll 21 from the cam means 58 onto the conveyor 33 and over the glass bracket 25. The slide mechanisms 41 permit the press roll 21 to bear by its own weight against the glass bracket 25 to cleanly break out the prescored pattern 26 by a predetermined statically applied force. Thus, the apparatus above described provides for the rollable movement of the novel press roll and its mounting which applies a uniform and predetermined static force against the glass bracket, which press roll cleanly breaks out a prescored glass pattern therefrom having a perpendicular edges free from chips and flaws.

It is to be understood that the form of the invention herewith shown and described is to be taken as an illustrative embodiment only of the same, and that various changes in the shape, size and arrangement of parts may be resorted to without departing from the spirit of the invention.

I claim:

1. In a glass pattern breaking apparatus of the type having a press roll rollably movable across a prescored pattern glass bracket supported on an aligned template for breaking out the prescored pattern, the improvement comprising
   a. a press roll including:
      1. an elongate rigid core shaft, and
      2. a resilient pliable body covering said core shaft, and
   b. means for floating said press roll in a plane substantially perpendicular to said template so that its weight freely bears against the glass bracket supported on said template to cleanly break out the prescored pattern.

2. A glass pattern breaking apparatus as claimed in claim 1, wherein said floating means comprises slide mechanisms freely movable in said perpendicular plane and the ends of said press roll are journalled in said slide mechanisms.

3. A glass pattern breaking apparatus as claimed in claim 2, wherein said slide mechanisms comprise a slide member and at least two pairs of spaced apart rollers for movably supporting said slide members in said perpendicular plane.

4. A glass pattern breaking apparatus as claimed in claim 3, wherein at least two of said rollers are adjustable for positioning the ends of the roll in a vertical plane.

5. A glass pattern breaking apparatus as claimed in claim 1, wherein said rigid core shaft is solid.

6. A glass pattern breaking apparatus as claimed in claim 1, wherein said rigid core shaft is hollow and is filled with a material whereby its weight can be changed to provide a breakout force for glass brackets of various thicknesses.

7. A glass pattern breaking apparatus as claimed in claim 1, including means for lifting said press roll from said glass bracket.

8. A glass pattern breaking apparatus as claimed in claim 7, wherein said lifting means comprises a cam, and a portion of said rigid core shaft which extends beyond said resilient body and over said cam to lift said roll when said core shaft rolls on said cam.

* * * * *